United States Patent [19]

Claytor et al.

[11] 3,789,420

[45] Jan. 29, 1974

[54] WIDE BAND RECORDING APPARATUS

[75] Inventors: Richard N. Claytor, Arlington; Dayton D. Eden, Dallas, both of Tex.

[73] Assignee: Advanced Technology Center, Inc., Grand Prairie, Tex.

[22] Filed: Feb. 2, 1971

[21] Appl. No.: 112,012

Related U.S. Application Data

[63] Continuation-in-part of Ser. No. 825,855, May 19, 1969, abandoned.

[52] U.S. Cl. ............ 346/1, 340/173 LM, 346/76 L, 346/135, 350/160 P

[51] Int. Cl. .......................................... G01d 15/34

[58] Field of Search ...... 346/76 L, 76 R, 1, 21, 135; 340/324 R, 173 CC, 173 CH, 173 LM, 173 LS; 40/28 C, 130 R; 350/160 P, 160 R

[56] References Cited

UNITED STATES PATENTS

| | | | |
|---|---|---|---|
| 3,655,256 | 4/1972 | Claytor et al. | 346/76 X |
| 3,219,993 | 11/1965 | Schwertz | 340/324 R |
| 3,314,073 | 4/1967 | Becker | 346/76 L |
| 3,438,022 | 4/1969 | Teeg et al. | 340/324 R |
| 3,496,662 | 2/1970 | Choate | 40/28 C |
| 3,533,823 | 10/1970 | Newkirk et al. | 346/135 X |

*Primary Examiner*—Joseph W. Hartary

[57] ABSTRACT

Disclosed is a wide bandwidth recording medium including a thermochromic material which changes reflectance with temperature. Information is recorded on the recording medium by selectively varying temperatures of discrete portions of the thermochromic material with a modulated energy beam such as a laser beam or electron beam. Techniques are described which permit extremely high resolution of data bits to be obtained in the recording medium even though the recording process is a thermal one. Apparatus is also disclosed for erasably and permanently recording information on thermochromic films.

6 Claims, 6 Drawing Figures

FIG. 5

PATENTED JAN 29 1974

3,789,420

SHEET 1 OF 2

RICHARD N. CLAYTOR
DAYTON D. EDEN
INVENTORS

BY Charles W. McHugh
ATTORNEY

RICHARD N. CLAYTOR
DAYTON D. EDEN
INVENTORS

BY Charles W. McHugh
ATTORNEY

WIDE BAND RECORDING APPARATUS

This is a continuation-in-part of application Ser. No. 825,855, filed May 19, 1969, now abandoned.

This invention relates in general to information recording apparatus. More particularly it relates to apparatus incorporating an erasable thermochromic recording medium for recording wide bandwidth radiant signals, i.e., signals having a frequency range of about 100 MHz.

Wide bandwidth recorders conventionally employ high quality photographic film to record an optical signal generated in response to an input signal which is to be recorded. For example, an optical signal may be generated in response to input signals covering a range of as much as 100 MHz, and the signal on the beam recorded on a photographic film moving past the recording station at velocities as high as 200 inches per second. The moving film is exposed by the modulated beam, and the information in the beam thereby recorded. Since the photographic emulsions must be subsequently processed to develop the recorded image, such emulsions are subject to dimensional instability. Therefore, allowance must be made in reviewing the recorded signal to compensate for any dimensional change in the recording medium.

Briefly, the present invention provides a heat-responsive recording medium which comprises a film of thermochromic material supported on or suspended in a suitable carrier. The thermochromic film, when used as the recording medium in recorders such as described above, requires no photographic processing or treatment to develop the recorded image. Furthermore, the film can be made especially stable so as to eliminate the need for a sophisticated apparatus to compensate for dimensional deviations.

It is therefore an object of this invention to provide a recording medium for use in high speed wide bandwidth recorders which is dimensionally stable, requires no processing, and which is capable of obtaining high resolution of images thereon. Additionally the film of the present invention is erasable and reusable, thus providing another cost advantage.

Other objects, features and advantages of the invention will become more readily understood from the following detailed description taken in connection with the appended claims and attached drawings in which:

Figures 1, 2, 4, 5:
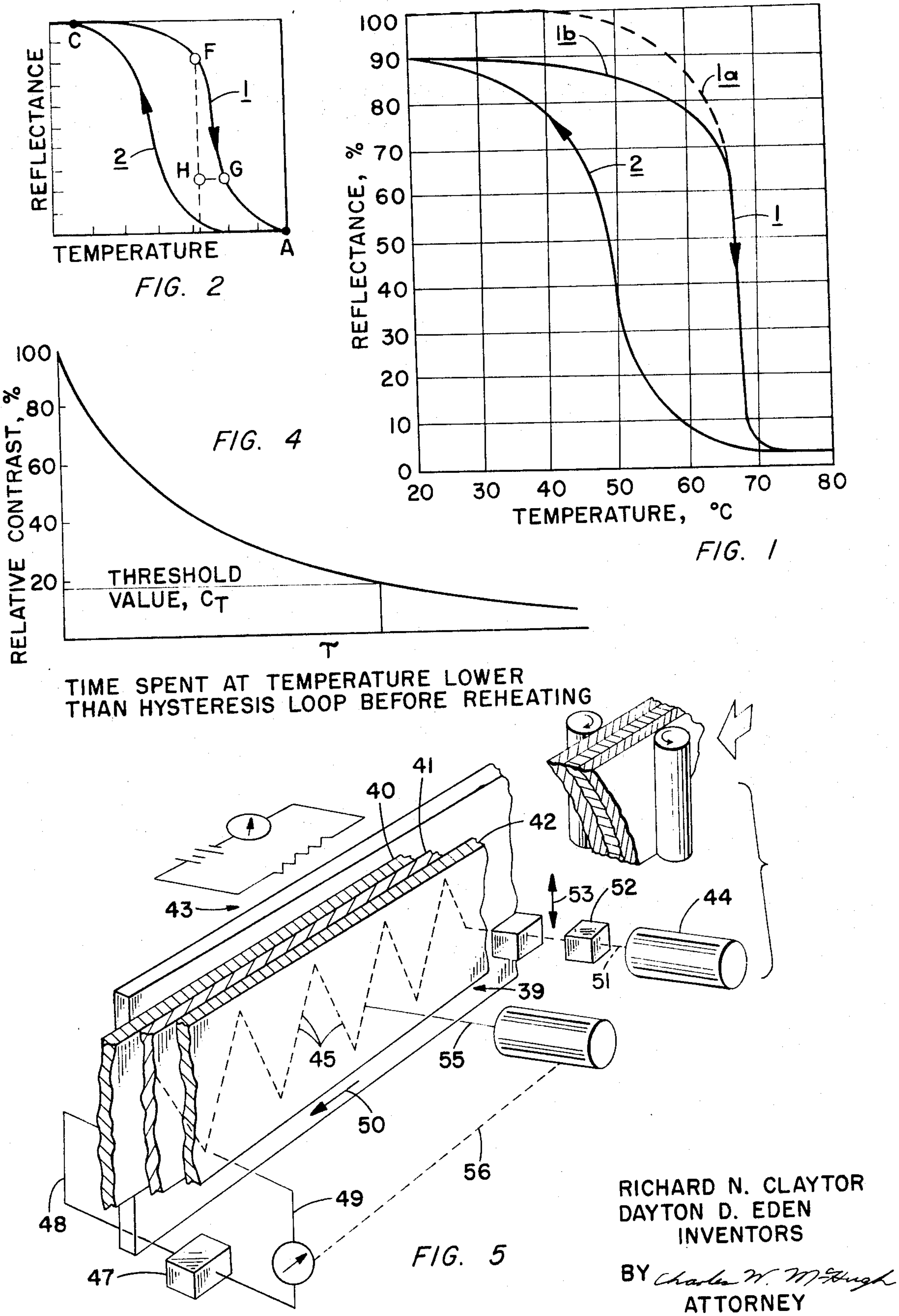
FIG. 1 is a plot of reflectance of red light (6,328A) versus temperature for cuprous mercuric iodide.
FIG. 2 is a schematic plot of reflectance versus temperature for a thermo-chromic material.
FIG. 4 is a plot of relative contrast (between a reconstructed image and the original image) versus the delay time during which the material rests at a temperature below the hysteresis loop prior to reheating.
FIG. 5 is a pictorial illustration of the preferred embodiment of the invention.

The term 'thermochromic material' as used herein refers to those materials which exhibit hysteresis in changing from a first reflectance to a second reflectance (in a portion of the visible spectrum) with change in temperature over a certain range. Physical characteristics other than reflectance (e.g., electrical conductivity) typically exhibit hysteresis in such materials, also.

For example, compounds having a general formula $M_2M'X_4$, where M may be $Ag^{1+}$, $Cu^{1+}$ or $Tl^{1+}$, M' may be $Hg^{2+}$ or $Cd^{2+}$ and X is a halide are known to exhibit thermochromism. Besides the ternary halides, other compounds including vanadium oxides and several ternary chalocogenides having the formula $MM_2'X_4$ where M is zinc, cadmium or mercury, M' is aluminum, gallium or indium, and X is sulphur, selenium or tellurium exhibit thermochromism.

In accordance with this invention, the above-described materials are generally used in the form of a film or dried paint formed by suspending a finely divided powder of such materials in a suitable binder. The binder, however, is used merely as a convenient means to support a uniform layer of the thermochromic material. Other means for providing a substantially uniform layer of thermochromic material are also within the intended scope of the invention. For convenience, the term "thermochromic film", is generally used herein to designate a layer, film or paint consisting essentially of materials of the class described which are suspended in any suitable medium or produced by any other acceptable means. In accordance with one specific embodiment of this invention, a thermochromic film is provided by impregnating at least one surface of a sheet of flexible carrier such as a non-metallic film (e.g., polyethylene, Mylar, etc) or a metallic strip (such as Invar) with a thermochromic material.

Since it is believed that the mechanisms by which such materials exhibit thermochromism are closely related in all such materials, cuprous mercuric iodide ($Cu_2HgI_4$) will be discussed hereinafter as exemplary of the entire class of compounds. It should be understood, however, that $Cu_2HgI_4$ is used herein as a typical example of thermochromic materials merely by way of illustration and not by limitation. Other materials of the class defined, under proper conditions, exhibit the phenomena described herein and may be substituted for $Cu_2HgI_4$ in appropriate application of the principles of this invention. Since the principles of the invention rely in part on certain phenomena exhibited by thermochromic material, these phenomena will be discussed in detail.

Paints or films of cuprous mercuric iodide change from a bright red at about room temperature to dark brown or black at about 66°C and return to their original red appearance on being cooled to about 35°C. The change from red to black and black to red is not an isothermal change. Instead, when the material is heated from a temperature of about 40°C to a temperature of about 70°C, the material changes from red to black passing through intermediate shades of brown at intermediate temperatures. However, upon cooling the same material, essentially no change in color is observed until the material is reduced to about 62°C; and complete transition from black to red is not effected until the material is lowered to about 30°C. This phenomenon is analogous to the hysteresis phenomenon observed in magnetic materials, and is conveniently referred to as a "hysteresis effect." The hysteresis effect may alternatively be described as the existence of a plurality of reflectances for a given temperature within a certain temperature range.

It has been discovered that extremely high resolution recording of information can be realized in thermochromic materials by varying the temperature of selected discrete portions of the material within its hysteresis loop. Furthermore, thermally generated images recorded in thermochromic materials in accordance with this invention may be indefinitely stored, reproduced, or erased as desired.

The hysteresis effect observed in cuprous mercuric iodide is graphically illustrated in FIG. 1. Line 1 represents the plot of reflectance of red light (6,328A) versus temperature as the material is heated from room temperature to approximately 80°C. Cuprous mercuric iodide is a bright red at toom temperature and retains its full brightness until it reaches approximately 45°C. Thereafter, increasing temperature causes the material to gradually lose some of its reflectance. After reaching about 66°C the reflectance decreases rapidly until the material appears so dark that it may be properly described as black near 70°C; a further increase in temperature has little appreciable effect on the color of the material. Above about 70°C, the material may be described as being in its hot or black saturated state, and additional heating produces no appreciable change in reflectance until temperatures are reached which cause chemical change, such as oxidation.

When the same material is cooled from its saturated black condition, a plot of reflectance versus temperature does not follow the same path it followed when the temperature was being increased. Instead, the material demonstrates what is conveniently described as a classical hysteresis effect. Reflectance increases with decreasing temperature along a path indicated by line 2 which is displaced some 16° or 17° below (to the left of) the temperature-increasing path indicated by line 1. The rate of increase in reflectance decreases when the material cools below about 45°C, and the material does not reach its maximum reflectance (i.e., it is not red saturated) until it reaches about 30°C. As with the temperature increase above the black saturated condition, a temperature decrease below 30°C has little effect. Once the material is red saturated, a further decrease in temperature produces essentially no further change in reflectance.

It should be noted that in some thermochromic materials, the hysteresis curve may not be truly symmetrical (in the classical sense), particularly if the temperature cycle time is short. For example, it has been experimentally observed that cuprous mercuric iodide may not recover its full red reflectance immediately when rapidly cooled from a high temperature. Thus, when the material is rapidly cooled to about room temperature, because of the delayed recovery the material may not immediately reach the original 100 percent red saturation condition. In the initial cold state, the hysteresis curve proceeds along line 1*a* – 1 and, upon cooling, follows line 2. If the material is reheated shortly after the above-described cooling, the increasing temperature versus reflectance plot will follow line 1*b* – 1. However, with sufficient time lapse between cooling and reheating, the low temperature reflectance will approach the 100 percent red saturation condition. Delayed recovery is of little consequence to recording, however, since it occurs near the low-temperature end of the hysteresis loop, while in those cases pertinent to this invention the recording is done at temperatures near the red-to-black transition temperature. Said red-to-black transition temperature is defined as the point on a temperature-increasing curve at which the curve has an inflection point. Accordingly, the hysteresis curves referred to hereinafter will ignore the delayed recovery and will be referred to as if they were always like the curve shown in lines 1*b* – 1 and 2, i.e., as if they were as symmetrical as classical hysteresis curves.

Since the temperature at which thermochromic materials can be accurately said to be 100 percent saturated is difficult to ascertain (because it approaches a true 100 percent saturation condition asymptotically), it is more practical to assign the term "saturated" to any reflectance condition which is within 5 percent of a pure saturation condition. Thus, cuprous mercuric iodide in its cold state (after being cycled through the hysteresis loop) can be said to be red saturated at any reflectance within 5 percent of the top of the reflectance loop, while the material in its heated condition may be said to be black saturated when its reflectance is within 5 percent of the height of the loop above the pure black saturated reflectance.

While necessity dictates that a reflectance of 5 percent or less, for example, be accepted as equivalent to no reflectance, prudence dictates that the definition of "saturation" should not be treated too loosely. Hence, it is not intended herein to use the term "saturation" so as to encompass, for example, reflectances well between the knees of the hysteresis envelope.

The two paths traced on FIG. 1 indicating reflectance of the material in transition between its two extreme reflectances form a loop which constitutes the envelope that will enclose all of the paths followed by the material regardless of its temperature history. The hysteresis loop, then, may be said to be bounded on its high end by the minimum temperature at which the material is black saturated, and bounded on its low end by the maximum temperature at which the material is red saturated. The fact that the ends of a loop may not always be precisely locatable with a particular material is of little consequence, since the operating region of the invention is usually in the vicinity of the center of the transition temperature range.

Characteristic behavior of thermochromic materials within the hysteresis loop is illustrated in FIG. 2.

As explained above, a thermochromic material will exhibit a change in reflectance upon being heated which is indicated by line 1. As the material is heated along line 1 from point C to point F, its reflectance begins to change. If, however, part of the material is held at a constant temperature equivalent to point F and the remainder heated further along line 1 to point G, the two portions of the material will exhibit different reflectances. Furthermore, if the hotter portion of the material is allowed to cool without first being heated to point A, the decreasing reflectance versus temperature plot will not follow line 1, but will be in the direction of point H. When the heated portion has cooled to the temperature of point H, the two portions of the material, although again at thermal equilibrium, will exhibit diverse reflectances as a result of their different thermal histories.

It should be noted that the plot of reflectance versus temperature for the material being cooled from point G is shown for simplicity as a horizontal line from point G to point H. However, as with conventional hysteresis phenomena, the decreasing temperature plot of reflectance versus temperature will be in the direction of line 2, but will approach line 2 asymptotically.

From the foregoing it will be observed that because of the hysteresis effect, optical images may be thermally generated in thermochromic materials by selectively varying the temperatures of portions of a thermochromic film. The image thus formed will be preserved in the film for as long as the temperature of the film is maintained within the temperature range encompassed by the hysteresis loop. The image, however, can be erased by simply heating the film to its black saturation temperature, e.g., to a temperature above the hysteresis loop.

It has also been discovered that thermochromic materials exhibit another unique phenomenon which is not analogous to magnetic memory; that is, a thermochromic film upon which an image has been formed by the techniques described above will retain the information stored therein even though the temperature of the film is lowered below the hysteresis loop. For example, if an entire film of thermochromic material is heated from point C (referring still to FIG. 2) to point F, and part of the material is maintained at a temperature corresponding to point F while the remainder is heated to point G, the two portions will exhibit diverse reflectance as explained hereinabove. Substantially the same difference in reflectances will be realized even after the heated portions cools from the temperature of point G to that of point H. Surprisingly, however, it has been found that it is not necessary to rigidly maintain the temperature of the thermochromic film at the bias temperatures in order to retain information recorded thereon. Images can be recorded on the film by manipulating its thermal history, and then the film temperature may be allowed to fall to room temperature (about 25°C), which is well below the low-temperature end of this particular hystereis envelope. After a period of time ranging up to several days, images—both positive and negative—can be made to reappear upon raising the temperature to at least the original bias temperature. Further raising of the temperature to slightly above the original bias temperature considerably improves the contrast in the reconstructed image, though it is always somewhat reduced from that in the original image.

Figure 3:
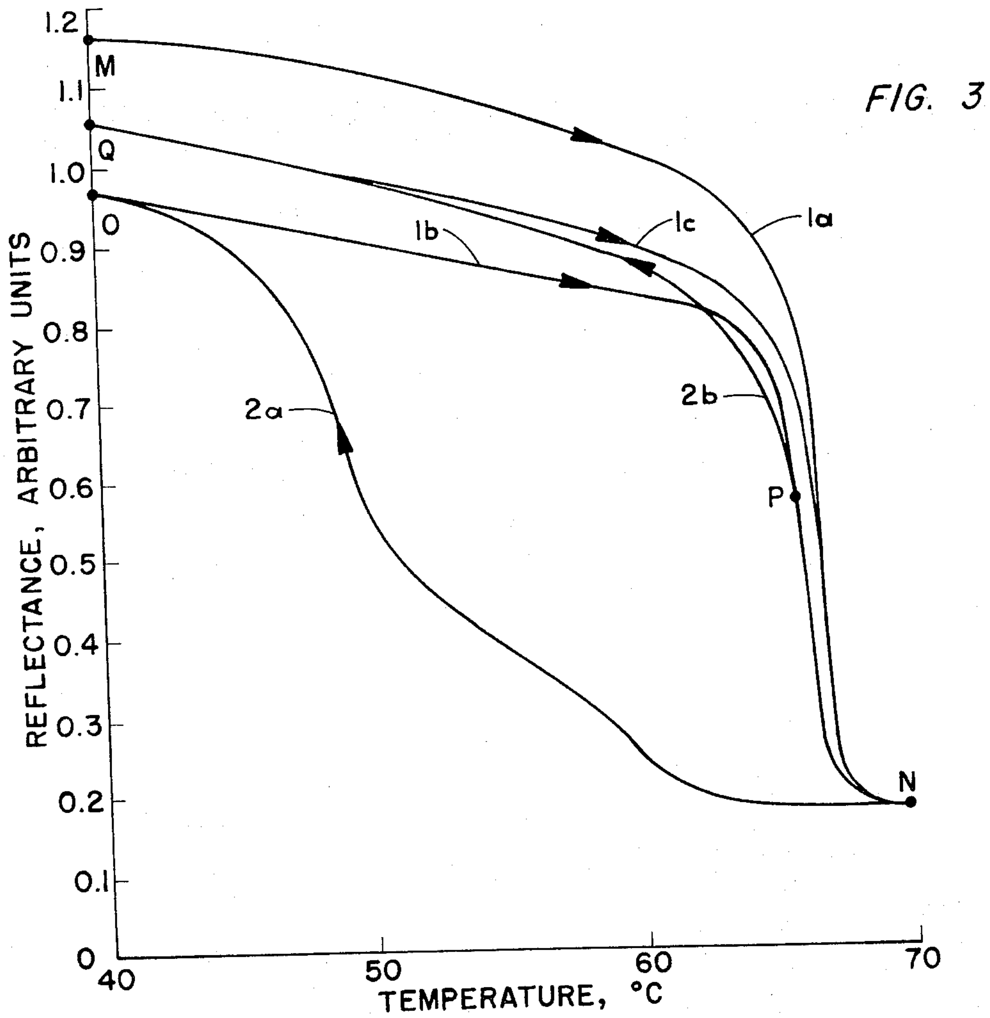
FIG. 3 is a plot of experimentally determined values of reflectance of red light versus temperature for cuprous mercuric iodide.

To better explain this special memory effect, reference will now be made to FIG. 3 which includes an accurate representation of one of the minor hysteresis loops in cuprous mercuric iodide (in silicone varnish). Starting with material having no residual thermal history effects, heating it will cause it to pass through point M along curve 1*a* to point N. Cooling it will cause it to follow curve 2*a* to point O. Promptly reheating the material will cause it to follow curve 1*b*. Regardless of how many times the material is cycled so as to include points N and O, the material will follow curves 1*b* and 2*a*. If, however, the material is heated only to point P and then cooled, a substantial portion of the cooling curve 2*b* surprisingly will lie above curve 1*b;* continued cooling will carry the material to point Q. Prompt reheating of such material will cause it to follow curve 1*c*, which is lower than curve 1*a* but—most significantly—slightly higher than and to the right of curve 1*b*. Let it now be assumed that one portion of the material was held at point P while another discrete portion of the material was heated to point N, and then both portions were cooled (to points Q and O, respectively). Reheating all the material will cause respective portions to follow curves 1*c* and 1*b*. Returning to a temperature corresponding to the temperature of point P will produce different reflectances in the material, because that portion of the material following curve 1*b* will exhibit a lower reflectance than that portion of the material following the higher curve 1*c*. Of course, the difference between the two recreated diverse reflectances is not quite as great as the difference originally established, but it is still appreciable. Further, reheating to a temperature slightly above the temperature corresponding to point P has been found to improve the contrast of the recreated image, apparently because the reflectance given by curve 1*b* is decreasing at a more rapid rate immediately above the temperature of point P than is the reflectance given by curve 1*c*.

It should perhaps be noted that in the nearly vertical portions of the curves, it is difficult to determine exactly how far apart the curves are spaced because of certain inherent experimental errors in temperature measurement and recording techniques. But the fact that images can be recreated after all of the material has been cooled to the temperature of point O, and the further fact that the contrast of the image is easily discernable with the naked eye, clearly indicates that the curves are separated by an appreciable amount.

The diverse thermal histories, and thus the information stored in the material, do not produce a permanent change in the material. When the temperature of the material is reduced below the temperature of point O, the information recorded thereon is not stored indefinitely. Upon reheating the material after storage for several days, the difference in reflectance of the two portions will be substantially less. Thus the image will appear to have faded. The length of time an image will remain stored in a thermochromic film held at temperatures below the hysteresis loop appears to depend largely on the original difference in reflectances recorded on the film. Thus, the greater the difference between the holding temperature and the recording temperature, the longer the storage time at temperatures below the hysteresis loop. While the constrast between an image and its background deteriorates with time, the resolution of the image does not deteriorate because all of the material remains in thermal equilibrum throughout this phase of the process.

The degree of contrast between different portions of material may be defined, with indirect reference to the exposing process that establishes an image, as the ratio of the reflectance of an unexposed portion to the reflectance of an exposed portion of the thermochromic surface. To illustrate this, let it be assumed that the bias temperature is set so that the reflectance of an exposed portion is 80 percent of room temperature reflectance. If exposure to a beam of radiant energy subsequently changes the reflectance of a portion of the surface to only 20 percent, it may be said that a contrast of 4:1 exists. Nest, cooling the surface below the low-temperature end of the hysteresis loop will cause the image to vanish as it apparently takes on the same reflectance as the background. Permitting the image to remain at the low temperature value for a certain length of time and then reheating the material to at least the same as (or slightly more than) the original bias temperature will cause the original image to reappear.

To perhaps contribute to an appreciation of the parameters involved, a relative (or fractional) contrast ratio may be defined as the ratio of the reconstructed contrast to the original contrast. The relative contrast becomes smaller as the time spent at a low temperature increases, as shown in FIG. 4. Referring specifically to this figure, a threshold value of relative contrast is shown. This threshold value is the relative contrast below which it is deemed to be impracticable to retrieve a satisfactory amount of the information stored on the surface. It is, of course, inversely proportional to the contrast of the original recording. Once a value is established for this threshold (which in turn corresponds to establishing an initial recording contrast), a meaningful definition may be ascribed to the storage time. To this end, let $C_0$ be the relative contrast when no time is spent below the hysteresis loop (which must therefore be 100 percent), and let $C_T$ be the assigned threshold value of relative contrast as shown in the figure. Then, the relaxation or storage time is simply the time taken for the relative contrast to fall to $C_T$.

From the foregoing it will be observed that information recorded in the material through deliberately varied thermal conditions impressed on the material can be semi-permanently stored in the material by simply reducing the temperature thereof below the hysteresis loop. The stored information can be reproduced at will by simply raising the temperature of the recording medium to at least the bias temperature. Furthermore, when the recording medium is stored at a temperature below the hysteresis loop, it is immune to further change by accidental or inadvertent exposure to energies which would produce diverse thermal histories if the material were stored at temperatures within the hysteresis loop.

Selective thermal changes in thermochromic materials may be effected by many various techniques. The method which is selected will depend upon the form in which the thermochromic material is utilized, as well as the purpose for which it is intended. For example, when thermochromic film is maintained at any temperature within the hysteresis loop (e.g., point F in FIG. 2), relatively little additional energy need be selectively added to raise discrete portions of the material to higher temperatures, thus writing information into the material. Temperature increases as slight as one-fourth degree centigrade are sufficient to produce wide changes in reflectance when using the portion of line 1 which is about midway between the knees of the curve. Therefore, information can readily be recorded on the thermochromic material with any source of energy which will be absorbed by the thermochromic material.

In accordance with one embodiment of the invention, images formed in the thermochromic material are produced by absorption of radiation patterns impinging on the thermochromic film. When a source of radiation of known wavelength is used to supply the recording energy to the thermochromic material, the material should be selected so that it has a high value of absorptivity of the wavelength used. In the visible portion of the spectrum, cuprous mercuric iodide is highly reflective in the red. However, this material absorbs other visible wavelengths. For example, blue or green light having a wavelength of 5,500 angstroms or less may be used to impart sufficient energy to the material to produce thermal images. Therefore, an image may be focused on the thermochromic material with light from one portion of the visible spectrum and the image recorded in the film (without conventional photographic processing) become immediately visible because of the changed reflectance of the material in another portion of the visible spectrum.

Furthermore, it has been unexpectedly discovered that extremely high resolution can be obtained in thermally generated images. In fact, the spatial resolution exhibited by $Cu_2HgI_4$ exceeds that of most photochemical films and is inferior only to the best high resolution spectrographic plates. Resolution quality in the one micron range is routinely observed in recording images by simply focusing the optical image on a film of thermochromic material and insuring that the beam power is sufficient to permit rapid exposure. Quite surprisingly, heat from such optical images does not significantly diffuse within the material during exposure times of interest. Of course, significant diffusion of the energy could be caused by application of greatly excessive amounts of energy through longer exposure times. Such application of excess energy would be comparable to overexposure of ordinary light-recording media. Overexposure can be avoided with the exercise of such ordinary care as one would observe in the use of equivalent high quality photographic emulsions with due attention to the reciprocity law formulated by Bunsen and Roscoe.

It will be appreciated by those skilled in the art that the energy absorbed by the thermochromic film will be proportional to the product of the power density of the beam and the exposure time. For exposure times of practical interest, this is equivalent to the reciprocity law ($E = Pt$) which is well known to those who work with photographic material. The reciprocity law of thermochromic materials differs from the reciprocity law of photographic materials, however, in that an upper limit exists on the exposure time, said upper limit being dependent on how much diffusion of heat through the film is tolerable. To keep diffusion low and thus achieve high resolution in recording images, the power density of the beam should be adequate to permit absorption of sufficient energy to cause a change in reflectance within a period of time that is not appreciably greater than (and preferably is shorter than) the ratio of the square of a given diffusion length and the material's thermal diffusivity.

A lower limit also exists on the power density of the exposing radiation, i.e., the material has a threshold below which no exposure will occur. This threshold has been experimentally found to be about 150 milliwatts/$cm^2$ for cuprous mercuric iodide in silicone varnish. Such a threshold is related to the above-mentioned upper limit on time in that the threshold is a function of the thermal properties of the material. The threshold exists because the temperature of a spot at which heat is being applied will never rise to the extent that a change in reflectance is observed if the power of the beam is so low that heat can diffuse through the material at least as fast as heat is being applied. Fortunately, the power density threshold has always been found to be so low as never to constitute a limitation on use of the material. Furthermore, the minimum exposure time involved (even for resolutions of one micron) are sufficiently long that they an be easily obtained and do not lead to prohibitively large power densities.

The thermal diffusivity of a material is given by the equation:

$$K = K/c_p\rho$$

where $c_p$ = specific heat of film at constant pressure, cal/gm degC $\rho$ = density of film, gm/cm$^3$ $K$ = thermal conductivity of the film, cal/cm degC sec.

To treat the aforementiond diffusion length, let it be assumed that heat is applied to a finite spot on the surface of the material. The excess radius, $l$, of the resulting spot at a time, $t$, after application of heat is given by $$l^2 = Kt$$

where is the thermal diffusivity. The excess radius, $l$, in this example is more generally referred to as the diffusion length. To achieve good resolution, $l$ must naturally be kept low; exactly how low seems necessary is, of course, dependent upon the wavelengths of the electromagnetic radiation being used in the recording process. Since the thermal diffusivity of a given material is fixed, control of diffusion length is achieved by keeping the time of application of heat short.

To illustrate how diffusion of heat is controlled, let it be assumed that a beam of radiant energy is focused to a diameter of one micron. When the beam impinges on the film, the directly heated spot is thus one micron in diameter. Let it next be assumed that it is desired to limit thermal diffusion of heat through the film so that after the beam has been removed the resulting spot is no larger than 2 microns. To determine how fast the heat must be applied, the thermal time constant, $\tau$, for this example must be calculated. The excess of spot diameter due to diffusion of heat is 2−1 = 1. Thus, $l$ is one-half of this, or ½ × 10$^{-4}$ cm. Assuming the film to be cuprous mercuric iodide suspended in a silicone varnish, a value for the specific heat (at the upper transition temperature) of about 1.1 calories/gram °C is reasonable. The density of cuprous mercuric iodide is about 6 gms/cm$^3$, and the density of the silicone varnish is about 1 gm/cm$^3$; since relatively little varnish is necessary to hold the thermochromic material, a density of about 5 gms/cm$^3$ for the dry film is typical. The thermal conductivity of the film will usually be influenced by the vehicle, which has the lower thermal conductivity. Since the thermal conductivities of varnishes are relatively low, the value for the silicone varnish is reasonably assigned as the value of thermal conductivity for the entire film, e.g., 5 × 10$^{-6}$ calories/second centimeter °C. Because the time periods are very short, the thermal characteristics of the substrate usually have no bearing on resolution in the film. Using the aforementioned equation and these exemplary values, this particular thermal constant is found to be 2.5 × 10$^{-3}$ sec, as follows:

$$\tau = l^2/ = l^2 c_p \rho/K$$

$$= (½ \times 10^{-4})^2(1.1)(5)/(5 \times 10^{-6})$$

$$= 2.5 \times 10^{-3} \text{ sec}$$

If the exposure time is appreciably greater than the thermal time constant, e.g., more than 10 times the thermal time constant, then one can expect that diffusion of heat away from the spot where heat is actually being applied would produce deleterious effects similar to "blooming" in photographic materials.

Assuming that the maximum exposure time which can be permitted is the time period to limit diffusion to one-half micron, it must next be determined what power the beam must have in order to raise the temperature of the material by the desired amount. It has been experimentally determined that an exchanged energy density of about 100 millijoules/cm$^2$ is sufficient to change the reflectance from a value near one end of the hysteresis loop to a value near the other end of the loop. (Calculation of the theoretical exchanged energy density—disregarding all losses—has given a value on the order of 15 millijoules/cm$^2$.) Next, dividing 100 millijoules/cm$^2$ by the time period of 2.5 × 10$^{-3}$ seconds, the power of the necessary beam is determined to be about 40 watts/cm$^2$. For the assumed beam diameter of 1 micron, the power required would be a modest 0.3 microwatts.

In situations where less precise resolution can be tolerated, the exposure time can be lengthened and the power requirement reduced in accordance with the aforementioned reciprocity law. For example, an exposure time of 30 seconds has been employed with the material described above, and the resolution was determined to be at least as good as 50 microns. On the other hand, a 10 watt carbon dioxide laser beam focused to a diffraction-limited spot will supply sufficient energy to raise the temperature of the thermochromic film illuminated thereby at least one-fourth degree centigrade with exposure times in the nanosecond range. Faster heating may be accomplished with appropriate energy sources.

The exposure time and the energy absorbed from the beam have been emphasized herein as if these two parameters alone dictated the total diffusion which will be realized. This is essentially correct, although a thorough study of FIG. 2 will reveal that these two parameters are involved only in that portion of the cycle represented by the curve segment from point F to point G. Removal of the heating source at a time when the material has been heated to point G does not simultaneously terminate the diffusion of all heat away from the spot which the beam or beams actually struck; diffusion actually terminates only when the temperature of the locally heated spot has returned to the temperature of the remainder of the material, i.e., when the heated and non-heated portions have again reached thermal equilibrium. However, the diffusion of heat associated with cooling, e.g., from point G to point H in FIG. 2, is not nearly as great as that associated with heating. The diffusion of heat is lower because there is an anomaly in the specific heat curves for heating and cooling just as there is an anomaly in the two reflectance curves. The average of the specific heat values of cuprous mercuric iodide in cooling from point G to point H in only about one-tenth as large as the average value for the corresponding portion of the heating curve. Thus, whatever heat is still being diffused as the material cools from point G to point H is leaving a region of relatively low specific heat and entering a region of high specific heat. Accordingly, heating of the surrounding region by virtue of diffusion effectively terminates as soon as the heat source is removed.

The discovery of the extremely high resolution capability is most unexpected since high resolution is not normally associated with thermally generated images. It is believed that the ultimate resolution which can be obtained is singularly a function of the grain size of the material, which fortuitously can be very small, e.g., at least as small as 1 micron The high resolution capability, coupled with the ability to rapidly absorb energy from the infrared as well as portions of the visible spectrum, make thermochromic films exceptionally well suited for high density recording media. These characteristics may be advantageously employed, for example, in recording wide bandwidth signals in digital form.

In conventional wide bandwidth recorders, a strip of high resolution photographic emulsion (such as 649 F emulsion) is moved past a recording station at a controlled rate. A laser beam or electron beam, modulated to emit radiation in response to external signals, is scanned transversely across the strip. Therefore, the information encoded in digital or analog form on the energy beam is recorded in the photographic emulsion as a series of small spots or varying shades of gray arranged in zig-zag fashion on the photographic emulsion. Obviously, after exposure of the emulsion, the emulsion must be photographically processed to develop the information bits recorded thereon. Unfortunately, photographic emulsions are not usually noted for their great dimensional stability. The emulsions usually tend to shrink when processed; thus, suitable, correction must be made in the apparatus reading the photographic record to allow for such change of dimensions.

In order to record the large amounts of data in the manner described, the recording beam must be focused to a small point, and the film must move by the recording station at very high rates. Conventional recorders operating over a bandwidth of 100 MHz may move the film linearly past the recording station as fast as 200 inches per second. The beam is also scanned transversly across the film to increase the recording density. In some recorders, the film is also oscillated in the transverse plane to increase the recording track of the beam. Obviously, correcting for shrinkage of a film recorded in this manner becomes quite burdensome.

In accordance with this invention, a thermochromic recording medium is utilized as the recording film in a wide bandwidth recorder similar to that described. While the sensitivity of a thermochromic material may not be as high as ordinary photographic materials, its resolution capabilities are at least as high or higher. However, sensitivity is not nearly as important as resolution in such systems, since laser light sources are sufficiently powerful to overcome any limitation in sensitivity. Many bits of data can be packed closely together on the film, and information may be recorded in terms of continuous shades of gray (in analog form) as well as in digital form.

A wide band recorder utilizing the principles of the invention is schematically illustrated in FIG. 5. The apparatus comprises a recording tape 39 consisting of a carrier 40 supporting a thermochromic film 41 on one side thereof. Carrier 40 is preferably an Ivar tape or similar supporting means which is noted for dimensional stability; preferably it should have a thermal expansion coefficient no greater than $0.8 \times 10^{-6}$ per °C. Carrier 40 may be, however, any suitable flexible supporting medium such as stabilized polyethylene film or the like. Thermochromic film 41 may be, for example, a mixture of thermochromic material suspended in a suitable binder, such as a varnish or the like. Alternatively, thermochromic film 41 may be a layer of thermochromic material deposited directly on or impregnated into at least the surface of carrier 40. In the preferred embodiment, an electrically conductive layer 42 is formed on the surface of film 41. Conductive layer 41, of course, must be transparent in the wavelengths which are to be absorbed by film 41. Tin oxide ($SnO_2$) is a suitable transparent conductive material.

Recording tape 39 is moved at a constant rate in the direction of the arrow 50 in FIG. 5 across the surface of a temperature control device 43. The temperature of tape 39 is maintained at the desired temperature by suitably controlling the temperature of device 43. Other means for controlling the temperature of the recording medium may be used, however, such as radiative heaters (not shown) or other heating means.

As recording tape 39 moves across temperature controller 43, the tape is moved in close proximity to and in a plane substantially normal to a recording means 44, which focuses the information beam 51 on discrete portions of the film moving by the recording station. The information beam 51 is typically amplitude modulated in a manner known to those skilled in the art by means 52 in accordance with information which is to be recorded. The beam 51 is moved at a controlled rate in a plane represented by arrow 53 which intersects the tape 39 so that the information beam may sweep across and selectively heat the thermochromic material. Conventional means, such as rollers and the like, may be used to transport tape 39 past the recording beam 51.

The addition of small amounts of thermal energy to any discrete portion of the film 41 will cause that portion of the film to change in reflectance very rapidly if controller 43 is adjusted to control the temperature of the film near its transition temperature. While the tape 39 is maintained at a nominal temperature equal to the transition temperature, the reflectance of discrete portions of film 41 are selectively varied by the absorption of small amounts of energy from a beam 51. The discrete portions of the film 41 heated by such radiation then assume a different reflectance as explained hereinabove, with the result that information which was imparted to beam 51 in one form becomes manifested in a second form.

Figure 6:
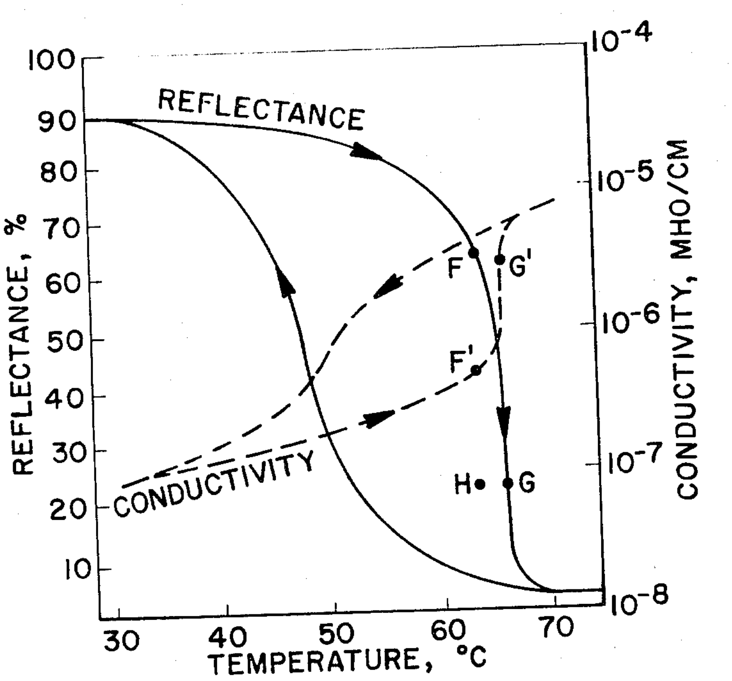
FIG. 6 is a schematic plot of electrical conductivity versus temperature for a thermochromic recording medium (cuprous mercuric iodide) superimposed on a plot of reflectivity versus temperature for the same material.

In the preferred embodiment of the apparatus of FIG. 6, recording means 44 is a laser which emits infrared radiation. The laset beam 51 is pulsed or modulated in response to external signals, each pulse of the laser corresponding to a bit of information in binary form. As the tape 39 is move past the laser 44, each pulse of the laser beam selectively heats a portion of film 41, thereby altering the reflectance of that discrete portion of film 41. Therefore, each pulse of the laser 44 is recorded as an information spot 45 on film 41. The beam emitted by laser 44 is preferably transversely scanned, in the manner of conventional recorders. Therefore, the density of spots 45 will be dependent upon such factors as the width of tape 39, the speed of travel of tape 39 in the direction of arrow 50, and the scan rate of the recording means. Furthermore, the tape 39 can be oscillated in the transverse plane to increase the scan of the beam.

In view of the high resolution capability of thermochromic materials and the speed with which the reflectance thereof can be changed, the recording capability of the apparatus described above is limited only by data modulation capabilities of the recording beam and the speed with which the tape 39 can be transferred past the recording station. Since the resolution capability of the thermochromic material is in the micron range, the recording beam may be focused to a point near one micron in width and modulated to emit a pulse of energy which will be only one micron long on the recording tape 39. Thus, with appropriate controls for scanning the beam across the tape and moving the tape past the recording station, a bit storage capability approaching 10 million bits per square centimeter of film may be realized.

From the foregoing it will be appreciated that information recorded on film 39 appears as a plurality of spaced, discrete portions having reflectances different from that of the bulk of the film. The recorded data will be manifested as long as the temperature of the thermochromic film 41 is maintained at or near the holding temperature. Also, tape 39 may be maintained at temperatures below the low temperature saturation point of the thermochromic film for short periods of time without loss of the data. Although the relatively dark spots 45 will tend to disappear into the light background upon cooling, the same spots 45 will reappear if the film is reheated to at least the holding temperature reasonably soon. The data may be permanently erased, however, by heating the film 41 to a temperature just above the high temperature saturation point. The erased tape may then be reused.

Read-outs of the data recorded on tape 39 may be accomplished by conventional methods. The temperature of the tape, however, should be maintained at a temperature near the original holding temperature to provide the best contrast for optical reading.

It is also known that thermochromic materials, and thus thermochromic films, exhibit a change in electrical conductivity coincident with change in reflectance. Cuprous mercuric iodide, for example, exhibits a change in conductivity of one to two orders of magnitude when passing through the reflectance transition range. The electrical conductivity also exhibits hysteresis.

FIG. 6 is a plot of conductivity versus temperature for cuprous mercuric iodide superimposed on a plot of temperature versus reflectance for the same material. As shown in the Figure, the conductivity of a film of cuprous mercuric iodide changes from about $5.5 \times 10^{-7}$ mhos/cm at 64°C to about $5.5 \times 10^{-6}$ mhos/cm at 68°C. This change in conductivity is coincident with a change of about 78 percent in reflectance of red light. This change in conductivity may advantageously be employed for electronically reading the information recorded in the film and for enhancement of contrast in data recorded with weak energy sources.

Referring again to FIG. 5, it will be observed that thermochromic film 41 is preferably disposed between an electrically conductive supporting tape 40 (such as Invar) and a transparent conductive film 42 ($SnO_2$). Current may be passed through film 41 by placing a potential across the film 41. For this purpose, a suitable power supply 47 may be electrically connected to supporting tape 40 and conductive film 42 as schematically illustrated by lead lines 48 and 49. A slight change in temperature resulting from the trace of a weak energy beam may be insufficient to alter the reflectance so as to be discernable by the unaided eye, but the concurrent small change in conductivity may easily be detected by suitable electrical means. By impressing a suitable voltage across the film 41 between conductive members 40 and 42, current will pass through the film 41 in the areas of highest conductivity. Since the spots 45 will be of higher conductivity as a result of heating by the beam 51, the discrete portions affected by the beam 51 will be further heated by Joule heating, thus raising the temperature of those portions even more and enhancing the change in reflectance. In this manner, the information recorded on film 41 by a weak energy beam can be substantially enhanced and presented in a form wherein greater contrast exists.

The tape 39 of FIG. 5 may also be interrogated electronically to determine the information stored therein by scanning the film with a low energy electron beam 55 while maintaining a potential across the thermochromic film by use of the conductive members 40 and 42. The interrogation scanning beam should be of lower energy than the writing beam to avoid recording the interrogation scan into the film. As the interrogation beam passes over a localized area of the film where a recording beam has previously altered the characteristics of the film (e.g., a spot 45), higher conductivity at that spot will allow increased current to flow between tape 40 and layer 42. By electronically recording the position of the scanning beam with reference to such increases in current, such recording being accomplished with means represented by the line 56 connecting the source of the scanning beam and an ammeter, the existence of previously recorded traces can be electronically determined. Apparatus for electronically recording the position of such scanning beams is conventional and hence will not be discussed in detail herein.

Alternatively, the exposed portions (spots 45) may be permanently recorded in film 41 by passing sufficient current through the film to heat the spots 45 to temperature substantially above the high end of the hysteresis loop. For example, by applying a large potential across film 41 after the reflectance and conductivity of discrete portions thereof have been altered in accordance with the teachings of the invention, excessive Joule heating will occur in the portions of the film which have the highest conductivity, i.e., spots 45. If sufficient heating occurs to chemically alter the film 41, such as by oxidation of the thermochromic material of the binder in which it is dispersed, the condition of the spots of highest conductivity will be permanently set in the material. Thus, previously heated spots will become charred, producing a permanent record which is independent of temperature and cannot be erased.

While the invention has been described with reference to a composite tape 39 having a thermochromic material disposed between conductive members 40 and 42, it will be understood that alternate means may be used to impress a voltage across a thermochromic film. For example, thermochromic film may be a moveable film of polyethylene or the like with a thermochromic material impregnated therein or coated on at least one surface thereof. Conductive means 40 and/or 42 may be stationary with respect to the film 41, and the film 41 drawn between the conductive means by suitable conventional apparatus (not shown). Various other modifications will be apparent to those skilled in the art in view of the teachings hereof. It is to be understood that although the invention has been described with particular reference to specific embodiments thereof, the forms of the invention shown and described in detail are to be taken as preferred embodiments of same, and that various changes and modifications may be resorted to without departing from the spirit and scope of the invention.

What is claimed is:

1. In the class of thermochromic materials that are of the order-disorder type and comprising the ternary halides and the ternary chalcogenide glasses, whose reflectances exhibit hysteresis with change in temperature over a certain range of temperatures, the method of initially achieving different reflectances in different portions of a thermochromic film by subjecting different portions of the film to different heating, temporarily returning the film to a state of substantially uniform reflectance, and subsequently causing the originally obtained diverse reflectances to reappear, comprising the steps of:

a. establishing a first portion of the film at a bias temperature within the hysteresis loop at which it will manifest a certain reflectance, and heating a second portion of the film to a second temperature which is higher than the bias temperature though still within the hysteresis loop, at which it will manifest a reflectance which is different than that of the first portion, whereby a contrast is discernable between the two portions;

b. cooling both portions of the film to a temperature at least as low as the maximum saturation temperature associated with the low temperature reflectance of the thermochromic film, whereby the entire film returns to a temporary state of substantially uniform reflectance; and c. thereafter, and within a period of time that is shorter than the relaxation time of the material, uniformly heating all portions of the film to a third temperature which is at least as high as the bias temperature, whereby a contrast in the reflectances of the two portions will again be manifested by virtue of the memory in the thermochromic film.

2. With a thermochromic material whose electrical conductivity exhibits hysteresis with change in temperature over a certain range, and whose high temperature state is also its high conductivity state, a method of recording comprising the steps of:

a. biasing the thermochromic material at a temperature within its hysteresis loop, whereby its physical state is caused to be particularly sensitive to the addition of heat;

b. recording information by shining radiant energy onto certain selected portions of the surface of said thermochromic material and thereby establishing different conductivities in different portions of the material, by virtue of subjecting said certain portions to more heating than other portions which did not absorb the radiant energy, whereby different portions of the material are caused to experience different thermal histories; and c. impressing an electrical potential across the material while it is at a temperature within its hysteresis loop, whereby greater current will flow through those certain portions of the material having higher conductivities and the contrast in reflectance between the radiantly heated portions and the other portions is enhanced.

3. The method of recording set forth in claim 2 wherein the electrical potential is established at a value which causes only enough current to flow through said certain portions so as to heat said portions to a temperature within the hysteresis loop, whereby an original difference in properties manifested by different portions of the material is changed to a greater difference.

4. The method of recording set forth in claim 2 wherein the electrical potential is established at a value which causes sufficient current to flow through said certain portions so as to heat said certain portions sufficiently beyond the high end of the hysteresis loop in order to achieve a chemical change in said certain portions, whereby an original difference in properties manifested by different portions of the material is permanently set in the material.

5. The method of recording set forth in claim 2 wherein the different thermal histories are established within a period of time that is not appreciably greater than the ratio of the square of a given diffusion length and the material's thermal diffusivity.

6. The method of recording set forth in claim 2 wherein electrical current is caused to flow through portions of the material within a period of time that is not appreciably greater than the ratio of the square of a given diffusion length and the material's thermal diffusivity.

* * * * *